June 24, 1930.                 H. O. HEM                    1,768,478
                            WEIGHING SCALE
                         Filed Oct. 17, 1928          3 Sheets-Sheet 3
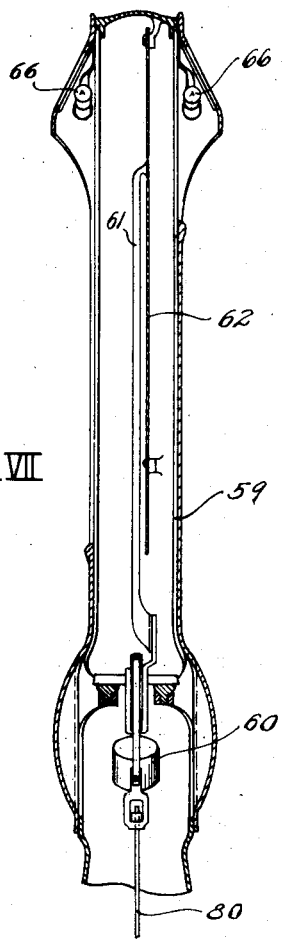
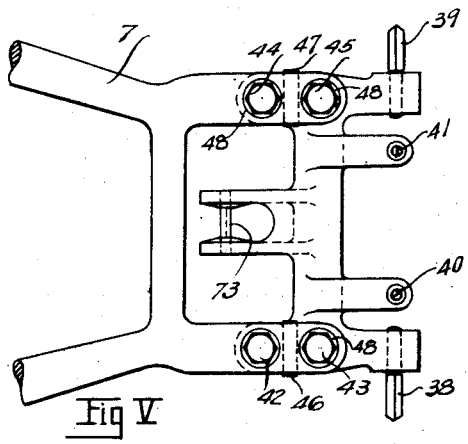
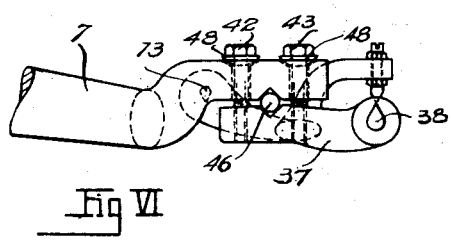
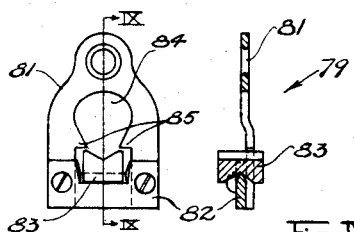
Inventor
Halvor O. Hem
By C. O. Marshall
Attorney Patented June 24, 1930

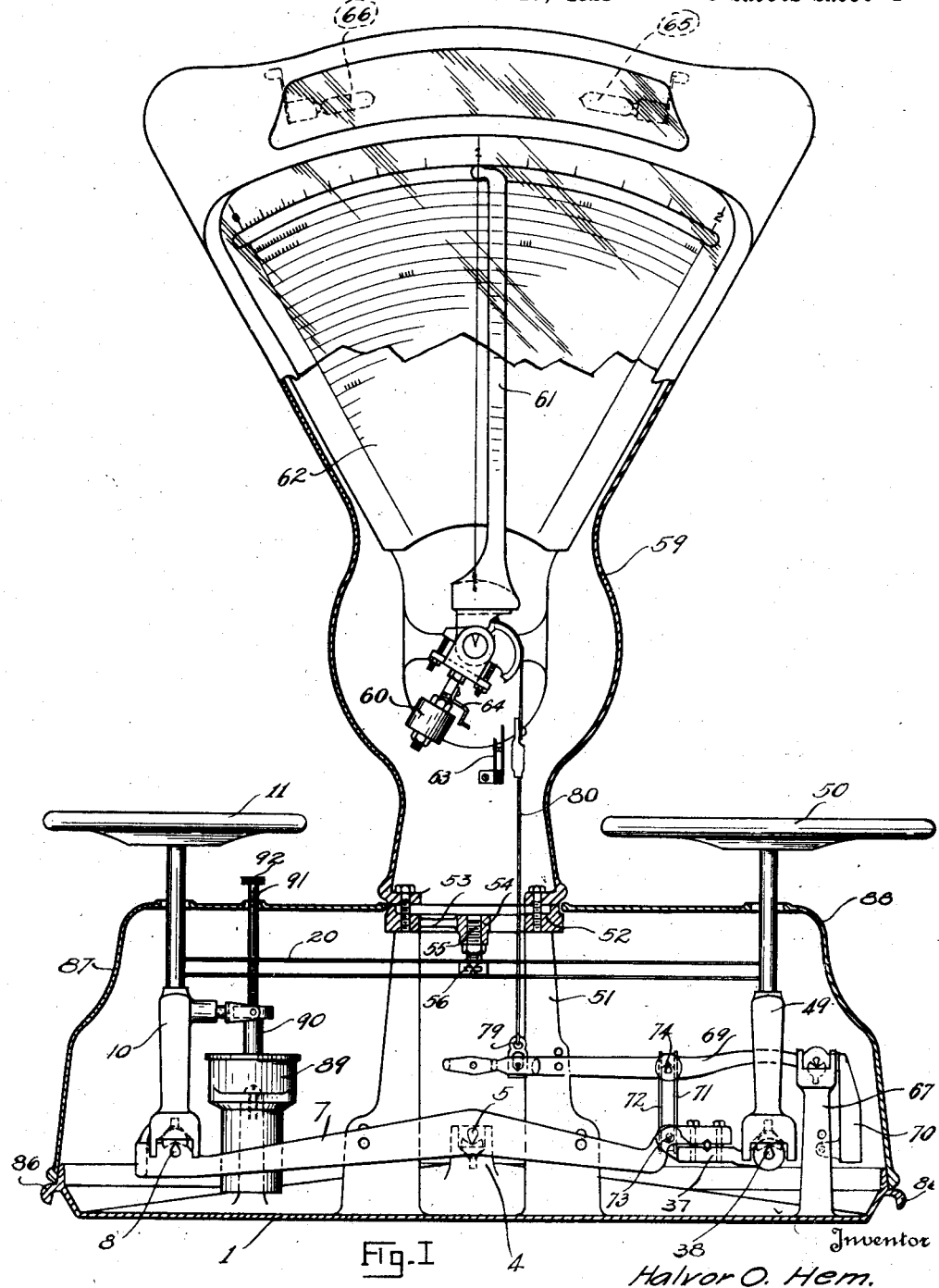

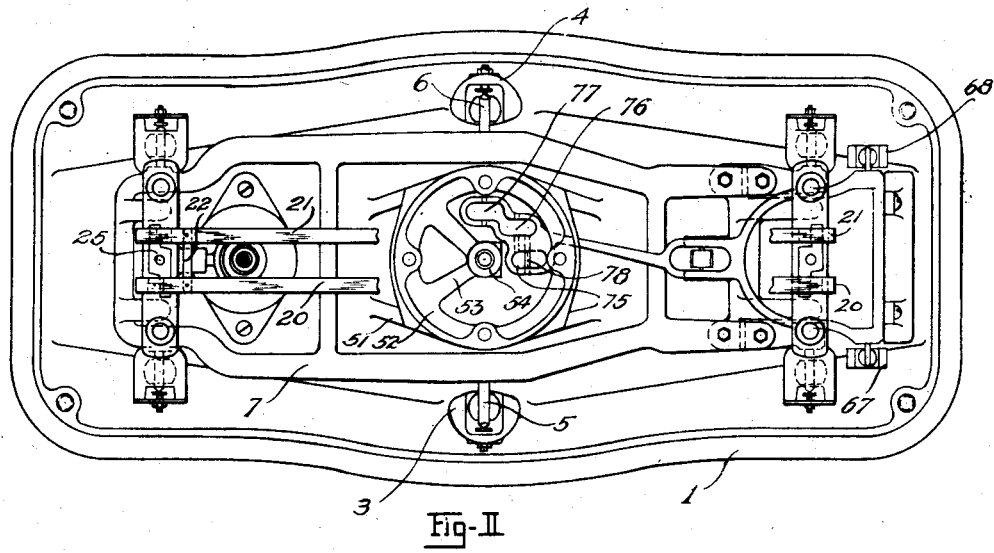
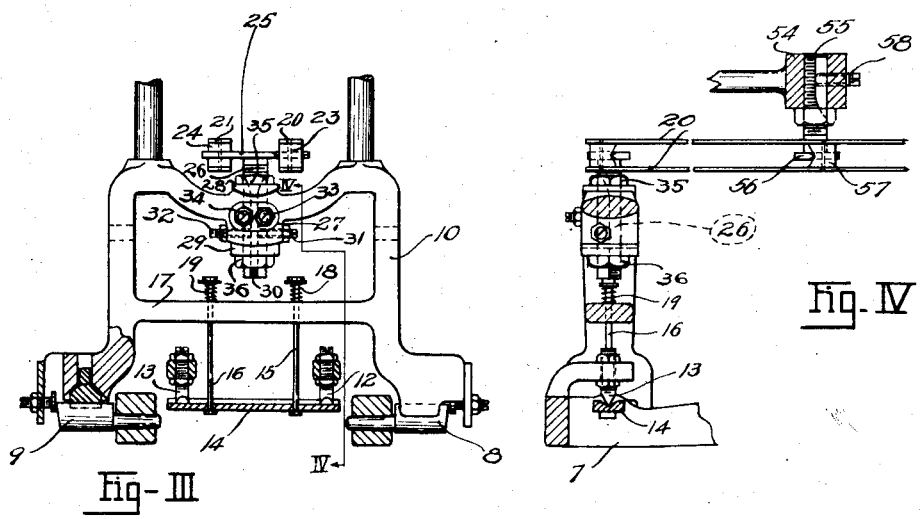

1,768,478

UNITED STATES PATENT OFFICE

HALVOR O. HEM, OF TOLEDO, OHIO, ASSIGNOR TO TOLEDO SCALE COMPANY, OF TOLEDO, OHIO, A CORPORATION OF NEW JERSEY

WEIGHING SCALE

Application filed October 17, 1928. Serial No. 313,025.

This invention relates to weighing scales, and more particularly to weighing scales for use in retail shops, and is an improvement which is applicable especially to scales of the type having poise and commodity receivers located at opposite ends of an equal arm lever, the commodity receiver supporting mechanism being connected to an automatic counterbalance.

One of the principal objects of the invention is the provision of improved adjustable means for supporting the commodity platform, retaining it in place upon its support and maintaining its condition of level.

Another object of the invention is the provision of improved retaining means for holding commodity receiving platforms and poise receiving platforms in position upon their load pivots.

Another object is the provision of improved means for adjusting the position of such retaining means and load pivots for the purpose of correcting the "range" of the lever pivots.

Another object of the invention is the provision of improved adjustable means for maintaining commodity and poise receiving platforms in the same condition of level throughout weighing movements of the mechanism.

Still another object is the provision of improved means for connecting the commodity receiver supporting mechanism to the automatic load-counter-balancing mechanism designed to permit changes of position of the automatic load-counterbalancing mechanism for convenience in the use of the scale.

Another object is to provide a compact, reliable and adaptable scale of the type referred to having improved means for adjusting its pivots and bearings to bring them with exactness into proper relation and thereby insure accurate results in the use of the scale.

Other objects and advantages will be apparent from the following description in which reference is had to the accompanying drawings illustrating a preferred embodiment of the invention and wherein similar reference numerals designate similar parts through several views.

In the drawings:—

Figure I is a front elevational view with parts broken away and parts in section, showing the assembled mechanism of a scale embodying the invention;

Figure II is a plan view showing the base and platform lever mechanism of the scale, parts being broken away;

Figure III is a side elevational view with parts broken away and parts in section, showing the platform supporting mechanism embodying some of the features of the invention;

Figure IV is a sectional elevational view taken substantially on the line IV—IV of Figure III;

Figure V is an enlarged plan view showing the end of the platform lever;

Figure VI is a front elevation thereof;

Figure VII is a fragmentary sectional side elevation taken substantially through the center of the housing enclosing and supporting the automatic load-counterbalancing mechanism of the scale, the automatic load-counterbalancing being shown in elevation;

Figure VIII is an enlarged detail elevation showing a stirrup forming part of the invention;

Figure IX is a sectional elevation taken substantially on the line IX—IX of Figure VIII.

Referring to the drawings in detail, the base 1 of the scale is preferably in the form of a casting integral with which are fulcrum stands 3 and 4 upon which is mounted, by means of knife-edged pivots 5 and 6, a platform supporting lever 7.

The lever 7 is of skeleton form and is provided adjacent one end with a pair of upwardly turned knife-edged load pivots 8 and 9 adapted to support a spider 10 which carries a poise receiving platform 11. In order to prevent the spider 10 from being tipped or otherwise lifted from the upwardly turned pivots 8 and 9, the lever 7 is also provided with a pair of downwardly turned pivots 12 and 13 which engage a trough-shaped bar 14 supported from the spider 10 by means of a pair of rods 15 and 16, which pass somewhat loosely through openings in a cross-bar 17 on the spider 10 and carry at their upper ends nuts and washers which are engaged by expansion springs 18 and 19. The action of the expansion springs 18 and 19 holds the trough-shaped bar 14 in constant engagement with the pivots 12 and 13 and automatically elevates the bar 14 to compensate for any wear that may occur on the pivots 8 and 9, 12 and 13 and the bearings which these pivots engage. In order that the mechanism may operate without binding or friction, it is necessary that the knife edges of the pivots 8 and 9 and the pivots 12 and 13 be in substantial alignment, a condition which is practically impossible of attainment by machining. The condition may be attained in the device of this invention, however, by adjustment of the pivots 12 and 13 which are in the form of threaded pins having chisel-like lower ends. These pins have a slip fit in openings in the lever and may be adjusted by and located in place by means of nuts threaded upon the pins above and below the lever. This construction makes possible not only the vertical adjustment of the pivots 12 and 13, but rotative adjustment about their vertical axes.

The condition of level of the poise receiving platform 11 is maintained by means of a check which consists of a pair of pull members 20 and a pair of push members 21 loosely connected by means of a bar 22, a bearing block 23 being pivotally mounted between the pull members 20, while an oppositely turned bearing block 24 is similarly mounted between the push members 21.

The bearing blocks 23 and 24 engage oppositely turned knife edges formed upon a plate 25 which is secured upon the upper end of a threaded post 26. The post 26 passes loosely through a boss 27 formed upon the spider 10 and is provided above and below the boss with washers 28 and 29. The faces of said washers 28 and 29 which engage the boss 27 are concave and convex, respectively, to fit complementary curved surfaces on the upper and lower ends of the boss 27 against which they lie. These surfaces are cylindrical and concentric and are curved about an axis which passes substantially through the center of the plate 25. The part of the post 26 which passes through the boss 27 is milled to form a fin 30 which is engaged by aligned adjusting screws 31 and 32 that are threaded through the boss 27. The milling of the post 26 also provides faces on each side of the fin 30 which are engaged by parallel adjusting screws 33 and 34, all of the said adjusting screws being provided with suitable lock nuts. Adjusting nuts 35 and 36 are threaded on the post 26 above and below the washers 28 and 29.

The height of the plate 25 may be adjusted by loosening one of the nuts 35 or 36 and tightening the other, and the post 26 may be turned about a vertical axis by loosening one of the parallel adjusting screws 33 or 34 and tightening the other. The plate 25 may also be tilted about a vertical axis by loosening one of the aligned adjusting screws 31 or 32 and tightening the other. The pivots of the lever 7 and knife edges of the plate 25 may thus be brought into parallelism and properly spaced.

The opposite end of the lever 7 consists of a member 37 which carries load pivots 38 and 39 and retaining pivots 40 and 41, which are the same in structure and function as the load pivots 8 and 9 and the retaining pivots 12 and 13 hereinbefore described. The member 37 is connected to the main body of the lever 7 by means of cap screws 42, 43, 44 and 45 which pass loosely through openings in the main body of the lever and are threaded in the member 37, and lying between the main body of the lever 7 and the member 37 are pins 46 and 47 upon which the member 37 is rocked when the cap screws on the side of the pins are loosened and those on the other side are tightened. This rocking of the member 37 raises and lowers the pivots 38, 39, 40 and 41. The range of the load and fulcrum pivots of the lever 7 may thus be adjusted. In order to prevent binding in the operation of the cap screws, they are provided with convex washers 48. A spider 49, similar in construction to the spider 10 above described, is supported upon the load pivots 38 and 39 and supports in turn a commodity receiving platform 50. The pull and push members 20 and 21 which maintain the condition of level of the platform 11 also extend into connection with the spider 49 and maintain the condition of level of the platform 50—the pivotal connection between the push and pull members and the spider 49 being adjustable in the same manner as the pivotal connection between the push and pull members of the spider 10.

Mounted upon the base 1 and centrally located thereon is a stand 51, the top 52 of which is ring-shaped and is provided with a pair of spoke-like arms 53 which support a boss 54. Threaded into the boss 54 is a shift post 55 upon the lower end of which is fixed a plate 56 having oppositely extending knife edges which are engaged by bearings 57 carried by the push and pull members 20 and 21 and being locked midway between the pivotal connection of the push and pull members to the spiders 10 and 49. The height of the plate 56 may be adjusted by turning the shift post 55 up or down in the boss 54 and it may be adjusted about a vertical axis by means of adjusting screws 58 of which there are two, operating in the same manner as the adjusting screws 33 and 34 mentioned above. Only one of the adjusting screws 58 is, however, visible in the drawings. It is apparent from the foregoing description that the knife edges of the several pivots of the platform supporting, retaining, and level maintaining mechanisms can be readily brought into such relation to each other that the scale may operate without error resulting from friction or binding in any of these pivotal connections.

Mounted upon the ring-like upper end of the stand 51 is an upright fan-shaped housing 59 which encloses and supports the automatic load-counterbalancing, indicating and illuminating mechanism of the scale. The automatic load-counterbalancing mechanism includes an indicating hand 61 that co-operates with a fixed chart 62 to indicate the weight and value of a commodity counterbalanced by the pendulum 60. Mounted within the housing 59 is a normally closed switch which is arranged to be opened when engaged by a finger 64 on the pendulum 60 when the pendulum is not counterbalancing a load and is therefore in "zero position." When the pendulum 60 moves away from the "zero position", the switch 63 automatically closes the circuit which supplies current to the lamps 65 and 66, and thereby illuminates the scale.

Formed upon the base 1 are auxiliary fulcrum stands 67 and 68 upon which is fulcrumed a motion transmitting lever 69 which is reliably held in its bearings by a weight 70. Motion is transmitted from the main lever 7 to the motion transmitting lever 69 by means of a pair of links 71 and 72 which are connected to bearings engaging pivots 73 and 74, the nose pivot 73 being fixed to the member 37 and the pivot 74 to the motion transmitting lever 69.

The nose of the motion transmitting lever 69 is provided with a plurality of oval openings 75, 76 and 77, within which a nose pivot 78 may be mounted. When mounted in the opening 75, the nose pivot 78 is in position to engage the stirrup 79. If the housing were turned at an angle of 45° to the position which is shown in Figure I, and the pivot mounted in the opening 76, the pivot would again be in position to engage the stirrup. If the housing were turned at an angle of 90° to the position to which it is shown in Figure I, the pivot would be mounted in the opening 77. The nose pivot 78 is connected by means of a stirrup 79 and a connection 80 to the pendulum 60. The stirrup 79 consists of a punching 81 (see Figures VIII and IX) to the lower end of which is fixed a knife-edged plate 82, and a bearing block 83 having upper and lower bearing grooves is mounted with its lower bearing groove engaging the knife edge of the plate 82, while its upper bearing groove is engaged with a knife edge of the nose pivot 78, the nose pivot passing through the opening 84 in the punching. The bearing block 83 is prevented from falling out of place when the stirrup is assembled by projections 85 which extend into the opening 84. The use of a bearing block 83 with its bearing grooves at right angles with each other between the knife edges of the plate 82 and the nose pivot 78 provides a universal joint between the lever and the connection which operates without binding or appreciable friction.

Supported upon a flange 86 which surrounds the base 1 is a pair of housing members 87 and 88 which serve to enclose and protect the mechanism supported upon the base 1. The housing members 87 and 88 may be removed after removing the platforms 11 and 50. The scale may therefore be set up, and the adjustment of the platform lever mechanism herein before described may be made to put the scale into excellent weighing condition before the housing sections 87 and 88 are added.

By placing the platform lever 7 below the check members 20 and 21 and by arranging the motion transmitting lever 69 between the platform lever 7 and check members 20 and 21 and so constructing and locating the lever 69 that it passes through the spider 49, a compact and sturdy structure is obtained.

Vibratory movements of the mechanism are damped and shocks are absorbed by a dash pot 89 mounted on the base 1, the dash pot plunger stem 90 being connected by means of a gimbal as shown in Figure I to the spider 10. Adjustment of the apertures of the dash pot plunger to compensate for changes of the damping medium may be made by means of the adjusting rod 91 which extends upwardly and terminates in a knurled knob 92 located exteriorly of the housing and below the platform 11.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, a lever having a knife-edged load pivot, a load-receiver supported on said pivot, a knife-edged retaining pivot on said lever, a bearing member engaging said retaining pivot, and means yieldably connecting said bearing member to said load-receiver.

2. In a weighing scale, in combination, a lever having knife-edged load pivots, a load-receiver supported on said pivots, a knife-edged retaining pivot on said lever, a bearing member, and means connected to said load-receiver to yieldably hold said bearing member against said pivot.

3. In a weighing scale, in combination, a lever having knife-edged load pivots, a load-receiver supported on said pivots, a knife-edged retaining pivot on said lever, a bearing member, and a spring connecting said bearing member to said load-receiver.

4. In a weighing scale, in combination, a lever having a pair of knife-edged load pivots, a load-receiver supported on said load pivots, a pair of knife-edged retaining pivots on said lever, a trough-like bearing bar engaging said retaining pivots, and means yieldably connecting said trough-like bearing bar to said load-receiver.

5. In a weighing scale, in combination, a lever having a pair of knife-edged load pivots, a load-receiver supported on said load pivots, a pair of knife-edged retaining pivots on said lever, a trough-like bearing bar engaging said retaining pivots, and a pair of spring pressed rods for yieldably connecting said bearing member to said load-receiver.

6. In a weighing scale, in combination, a lever having a knife-edged load pivot, a load-receiver supported on said pivot, a knife-edged retaining pivot on said lever, a bearing member connected to said load-receiver and engaged by said knife-edged retaining pivot, and means for adjusting said knife-edged retaining pivot about an axis extending at right angles to its knife edge.

7. In a weighing scale, in combination, a lever having a knife-edged load pivot, a load-receiver supported on said pivot, a knife-edged retaining pivot on said lever, a bearing member connected to said load-receiver and engaged by said knife-edged retaining pivot, means for adjusting said knife-edged retaining pivot about an axis extending at right angles to its knife edge, and means for raising and lowering said knife-edged retaining pivot.

8. In a weighing scale, in combination, a lever, a load pivot carrying lever extension, means for pivotally connecting said lever extension to said lever, and means for adjusting said extension about such pivotal connection and for securing said extension in adjusted position.

9. In a weighing scale, in combination, members consisting of a lever and a load pivot carrying lever extension, said lever and extension having registering notches, pins lying in said notches and adjusting screws extending through one of said members and threaded into the other of said members.

10. In a weighing scale, in combination, a lever, a load pivot carrying lever extension, means for connecting said extension to said lever for adjustment about an axis, and a retaining pivot mounted on said extension.

11. In a weighing scale, in combination, a lever, a load pivot carrying lever extension, means for connecting said extension to said lever for adjustment about an axis, a retaining pivot mounted on said extension, and a nose pivot mounted on said extension.

12. In a weighing scale lever, in combination, a lever extension having a pair of load pivot carrying arms and a pair of retaining pivot carrying arms, said arms being arranged to support knife-edged load pivots and retaining pivots with their knife edges in alignment, and means for adjustably connecting said extension to a main lever body.

13. In a weighing scale, in combination, a load-receiver and means for maintaining the condition of level of said load-receiver, said maintaining means including a knife-edged pivot and means for mounting said knife-edged pivot on said load-receiver for adjustment about a horizontal axis approximately intersecting the knife edge of said pivot.

14. In a weighing scale, in combination, a load-receiver and means for maintaining the condition of level of said load-receiver, said maintaining means including a knife-edged pivot and means for mounting said knife-edged pivot on said load-receiver for adjustment about horizontal and vertical axes approximately intersecting the knife edge of said pivot.

15. In a weighing scale, in combination, a load-receiver and means for maintaining the condition of level of said load-receiver, said maintaining means including a plate having opposite directed aligned knife edges, push and pull links acting respectively upon said knife edges and means for connecting said plate and said load-receiver for adjustment about horizontal and vertical axes approximately intersecting the line of said knife edges.

16. In a weighing scale, in combination, a load-receiver and means for maintaining the condition of level of said load-receiver, said maintaining means including a plate having oppositely directed aligned knife edges, a post supporting said plate, said post extending loosely through an opening in said load-receiver, and a member on said post having a surface curved about a horizontal axis approximately intersecting the line of the knife edges of said plate, said load-receiver having a curved surface fitting the curved surface on said member.

17. In a weighing scale, in combination, a load-receiver, said load-receiver having a vertical opening and concentrically curved surfaces at the upper and lower ends of said opening, a post extending through said opening, members surrounding said post above and below said opening and having curved surfaces fitting the curved surfaces on said load-receiver, and a plate secured upon said post and having a knife edge, the line of the knife edge approximately intersecting the axis of curvature of said surfaces.

18. In a weighing scale, in combination, a load-receiver, said load-receiver having a vertical opening and concentrically curved surfaces at the upper and lower ends of said opening, a post extending through said opening, members surrounding said post above and below said opening and having curved surfaces fitting the curved surfaces on said load-receiver, a plate secured upon said post and having a knife edge, the line of the knife edge approximately intersecting the axis of curvature of said surfaces, means whereby said post may be adjusted about its axis, and means for securing said post in adjusted position.

19. In a weighing scale, in combination, a load-receiver, said load-receiver having a vertical opening and concentrically curved surfaces at the upper and lower ends of said opening, a post extending through said opening, members surrounding said post above and below said opening and having curved surfaces fitting the curved surfaces on said load-receiver, a plate secured upon said post and having a knife edge, the line of the knife edge approximately intersecting the axis of curvature of said surfaces, means for raising and lowering said post, means whereby said post may be adjusted about its axis, and means for securing said post in adjusted position.

HALVOR O. HEM.